W. E. PRALL.
Hot Water Elevator.
No. 3,408.
Reissued April 27, 1869.
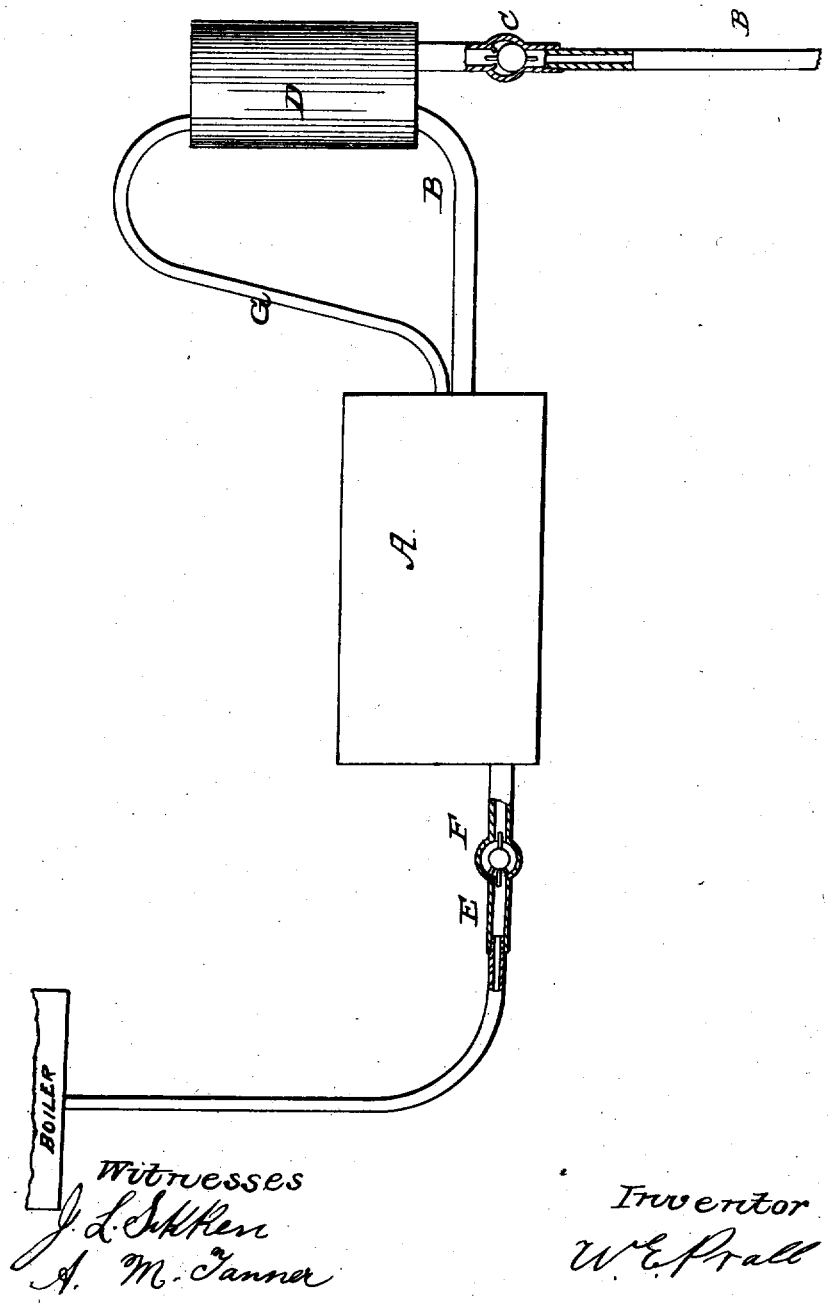
Witnesses
J. L. Sikkler
A. M. Tanner
Inventor
W. E. Prall
N. PETERS. Photo-Lithographer, Washington, D. C.

United States Patent Office.

WILLIAM E. PRALL, OF WASHINGTON, DISTRICT OF COLUMBIA, (FOR HIMSELF,) AND A. C. RAND, OF NEW YORK, N. Y., ASSIGNEE OF WILLIAM E. PRALL.

*Letters Patent No.* 77,090, *dated April* 21, 1868; *reissue No.* 3,408, *dated April* 27, 1869.

IMPROVEMENT IN HOT-WATER ELEVATORS.

The Schedule referred to in these Letters Patent and making part of the same.

*To all whom it may concern:*

Be it known that I, WILLIAM E. PRALL, of Washington, in the county of Washington, and District of Columbia, have invented a new and useful Improvement in Water-Elevators; and I do hereby declare that the following is a full, clear, and exact description of the same, reference being had to the annexed drawing, which represents my improved water-elevator, in which the different parts are designated by different letters.

This invention relates to a device for raising water by means of the pressure of the steam generated within such device, and as a result of the condensation of such steam within a vessel properly connected therewith, and constituting a part thereof, and it consists in so combining and arranging the proper devices as to produce the result above indicated.

A, in the drawings, represents a steam-generator which may be in the form of a heating-chamber placed within a furnace, and arranged in any suitable manner to utilize a portion of the heat thereof in generating steam, or it may be a water-back attached to a stove, or it may be any other form of a generator, and so arranged as to be properly heated.

B represents a pipe which is connected to the generator at a point some distance above the lowest surface thereof, which is for the purpose of conducting water from the condensing-vessel D to the generator.

B′ represents an induction-pipe, which is for the purpose of conveying the supply of water to be elevated to the condensing-vessel.

C represents a check-valve, which is to be placed in the pipe B′, and so arranged as to open inwards, so that any water which may have passed said valve, shall be prevented from returning to the well or other source of supply, and so that the contents of the condensing-vessel may be delivered into the generator, and not be allowed to pass out through such valve.

D represents a cylindrical vessel which is to be of any dimensions required by the amount of fluid to be raised, and consequently of the steam to be condensed.

To the under side or lower head of this vessel is to be attached the upper end of the induction-pipe B′, and also the outer or upper end of the pipe B, which conducts the water from the condenser to the generator.

G represents a pipe, one end of which is to be attached to the generator a short distance above the point where the feed-water pipe enters, from which point it passes to, and is secured to the upper portion of the condenser. The office of this pipe is to convey the steam which is formed in the steam-generator to the condenser to be therein condensed.

E represents a discharge-pipe which is to be attached to the lower portion of the generator, and is to extend from thence to any desired reservoir or place of destination.

F represents a check-valve which is to be inserted in the discharge-pipe, and is to open outwards for the purpose of preventing the return of water to the generator after it has once passed this valve.

I have described this device as a water-elevator, but it is apparent that any liquid which would not be injured by being warmed with the steam, may be elevated by it with the same facility as water.

The operation of my elevator is as follows:

The parts being arranged as above described, and filled with water, a fire is to be lighted, as a consequence of which steam will be generated in the vessel prepared for that purpose, which steam will rise to the surface of the water in said vessel, and as a consequence a pressure will be created therein, which will force out the water from such vessel through the pipe E, and will continue thus to force out the water until its surface in the generator goes below the mouth of pipe G, when the steam will pass through such pipe into condenser D.

When the steam commences to pass to the condenser, the pressure in the generator will be reduced, and consequently the weight of the column of water in the discharge-pipe will close the check-valve F, and as it is clear that an equilibrium of pressure will be established between the pressure upon the top and bottom of the water in the condenser, when, by its own gravity, the water will pass from said condenser to the generator, thus leaving the condenser filled with steam to be condensed for the purpose of forming a vacuum which, when formed or partially formed, permits the water to flow into the condenser, through check-valve C, which, at the proper time, closes and retains the water therein, preparatory to being emptied into the generator at the next pulsation, and thus the operation is continued, water being discharged as fast as steam is generated of sufficient pressure to elevate the water to the required height, which action may be regulated by the intensity of the fire in contact with the generator.

It is apparent that this device may be constructed on a scale which would adapt itself to use for domestic purposes, and in connection with a stove, or a range, or that when it is desirable, it may be made larger, and used in connection with a heating-furnace constructed for that purpose.

Having described my invention,

What I claim and desire to secure by Letters Patent, is—

The combination of the steam-generator, condenser, and system of pipes and valves, whereby to force the water from the generator to the level of the connecting steam-pipe through which the steam escapes to the condenser, and by its condensation produces a vacuum sufficient to cause the water to rise into and fill, or partially fill the generator, and thus accomplish automatically the alternate partial filling and partial emptying of the generator substantially in the manner set forth.

In testimony whereof, I have signed my name to this specification before two subscribing witnesses.

W. E. PRALL.

Witnesses:

EDM. F. BROWN,

C. T. CLAUSEN.